US012698380B2

(12) United States Patent
Mejia et al.

(10) Patent No.: US 12,698,380 B2
(45) Date of Patent: Aug. 4, 2026

(54) RUBBER COMPOSITION FOR A WINTER TIRE AND A WINTER TIRE

(71) Applicant: The Goodyear Tire & Rubber Company, Akron, OH (US)

(72) Inventors: Luisa Fernanda Munoz Mejia, Troine (LU); Claude Charles Jacoby, Wasserbillig (LU); Karmena Izabela Anyfantaki, Helmsange (LU); Evangelia Konstantaki, Bissen (LU); Veronique Marie-Josee Herbeuval, Waltzing (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 623 days.

(21) Appl. No.: 18/065,763

(22) Filed: Dec. 14, 2022

(65) Prior Publication Data

US 2023/0303809 A1 Sep. 28, 2023

Related U.S. Application Data

(60) Provisional application No. 63/324,314, filed on Mar. 28, 2022.

(51) Int. Cl.

*C08L 9/00* (2006.01)
*B60C 1/00* (2006.01)
*C08L 91/00* (2006.01)

(52) U.S. Cl.

CPC .............. *C08L 9/00* (2013.01); *B60C 1/0016* (2013.01); *C08L 91/00* (2013.01)

(58) Field of Classification Search

CPC .......... C08L 9/00; C08L 91/00; B60C 1/0016; B60C 1/00

See application file for complete search history.

(56) References Cited

U.S. PATENT DOCUMENTS

| | | | | |
|---|---|---|---|---|
| 4,485,205 | A | 11/1984 | Fujimaki et al. | |
| 5,677,402 | A * | 10/1997 | Halasa | C08F 136/06 526/174 |
| 5,967,211 | A | 10/1999 | Lucas et al. | |
| 7,671,132 | B1 | 3/2010 | Thielen et al. | |
| 9,441,098 | B1 * | 9/2016 | Isitman | B60C 1/0016 |
| 9,758,650 | B1 | 9/2017 | Isitman et al. | |
| 2005/0131112 | A1 * | 6/2005 | Henning | B60C 1/0016 524/493 |
| 2007/0293619 | A1 | 12/2007 | Jacoby | |
| 2020/0392311 | A1 * | 12/2020 | Chouvel | B60C 1/0025 |
| 2021/0354512 | A1 | 11/2021 | Jacoby et al. | |

OTHER PUBLICATIONS

Extended European Search Report for Application No. 23162953.6, dated Aug. 21, 2023.

* cited by examiner

*Primary Examiner* — Kumar R Bhushan
(74) *Attorney, Agent, or Firm* — Mandy B. Willis

(57) ABSTRACT

The present invention is directed to a rubber composition comprising 35 phr to 60 phr of a first polybutadiene rubber having a glass transition temperature within a range of −80° C. to −105° C., 5 phr to 30 phr of a second polybutadiene rubber having a glass transition temperature within a range of −20° C. to −40° C., 10 phr to 60 phr of polyisoprene selected from one or more of synthetic polyisoprene and natural rubber, 30 phr to 200 phr of at least one filler, and 40 phr to 120 phr of at least one plasticizer having a glass transition temperature within a range of −40° C. to −110° C. Furthermore, the present invention is directed to a tire comprising the rubber composition.

19 Claims, No Drawings

RUBBER COMPOSITION FOR A WINTER TIRE AND A WINTER TIRE

FIELD OF THE INVENTION

The present invention is directed to a rubber composition, in particular a sulfur curable or cured rubber composition, e.g., for a tire. Moreover, the present invention is directed to a rubber component comprising such a rubber composition as well as to a tire comprising said rubber composition and/or rubber component.

BACKGROUND OF THE INVENTION

The tire industry has been developing tires particularly suitable for different weather conditions. Winter tires have been developed to provide suitable performance for cold weather conditions including snow and ice. In some Nordic regions, ice is frequently present on roads such that there is a desire to have even better performance on ice than typically necessary for normal winter tires. In addition, there is a growing demand for winter tires having a further reduced rolling resistance. As a consequence, there is a need to develop tires particularly suitable for driving on ice with limited rolling resistance.

SUMMARY OF THE INVENTION

One object of the present invention may be to provide a winter tire with advanced performance on ice or on iced roads.

Another object of the present invention may be to provide a winter tire with improved rolling resistance.

Yet another object of the present invention may be to provide a winter tire with advanced performance on ice (e.g., grip) and advanced rolling resistance.

In addition, an object may be to provide at the same time good snow, wet and/or dry handling performance.

The present invention is defined by the scope of appended claim 1. Further, embodiments are provided in the dependent claims and in the summary herein below.

Thus, in a first aspect, the present invention is directed to a rubber composition comprising from 35 phr to 60 phr of a first polybutadiene rubber having a glass transition temperature within a range of −80° C. to −105° C., from 5 phr to 30 phr of a second polybutadiene rubber having a glass transition temperature within a range of −20° C. to −40° C., and 10 to 60 phr of polyisoprene selected from one or more of synthetic polyisoprene and natural rubber. Furthermore, the rubber composition comprises from 30 phr to 200 phr of at least one filler, and from 40 phr to 120 phr of at least one plasticizer having a glass transition temperature within a range of −40° C. to −110° C.

The rubber composition in accordance with the present invention combines three polymers, i.e. a low glass transition temperature polybutadiene rubber, a high glass transition temperature polybutadiene rubber and a polyisoprene, preferably a cis 1,4-polyisoprene (such as with a glass transition temperature between −60° C. and −75° C.), together with relatively high amounts of plasticizer within the claimed Tg range. The compound according to the present invention provides good grip at very low temperatures and good hysteresis properties which translate into a limited rolling resistance of the tire.

In one embodiment, the first polybutadiene rubber has a vinyl content of less than 25%, preferably less than 20%, or even more preferably less than 15%.

In another embodiment the first polybutadiene rubber has a vinyl content of at least 1%, optionally at least 5% or at least 10%. Such low vinyl ranges have been found to be most preferably.

In another embodiment, the first polybutadiene rubber has a cis content of less than 60%, preferably less than 50% or even less than 40%. Preferably, the cis content is higher than 10% and preferably higher than 20% or 30%. In other words, the first polybutadiene rubber is a low cis polybutadiene which has optionally been made with a n-butyl-lithium initiator. In particular, the low cis content helps to avoid crystallization at low temperatures.

In another embodiment, the first polybutadiene rubber has a weight average molecular weight Mw within a range of 250k g/mol to 450k g/mol. Mw is determined herein using gel permeation chromatography (GPC) according to ASTM 5296-11 using polystyrene calibration standards, or equivalent.

In another embodiment, the first polybutadiene rubber has a glass transition temperature of at most −80° C., preferably of at most −85° C., and/or of at least −99° C., preferably of at least −95° C.

In another embodiment, the second polybutadiene rubber has a weight average molecular weight Mw within a range of 500k g/mol to 900k g/mol, preferably to 800k g/mol or 700k g/mol.

In another embodiment, the second polybutadiene rubber has a vinyl content of more than 50%, preferably more than 60% or more than 70%. In other words, the second poly butadiene rubber is a high vinyl polybutadiene rubber. Such features support for instance the miscibility with polyisoprene.

In another embodiment, the second polybutadiene rubber has a glass transition temperature within of at least most −20° C. and/or at least −35° C.

In another embodiment, the rubber composition is free from styrene containing rubber, such as styrene butadiene rubber, or comprises less than 5 phr, preferably less than 1 phr of such rubber.

In another embodiment, the rubber composition comprises more first polybutadiene rubber than polyisoprene, all by weight. Preferably, the rubber composition comprises at least 5% (by weight) more, or alternatively at least 2 phr more, of the first polybutadiene than polyisoprene. Preferably, the rubber composition comprises at most 20% (by weight) more, or alternatively at most 15 phr more, of the first polybutadiene than polyisoprene.

In another embodiment, the rubber composition comprises more polyisoprene than second polybutadiene, all by weight. Preferably, the rubber composition comprises at least 5% (by weight) more, or alternatively at least 2 phr more, of the polyisoprene than of the second polybutadiene. Preferably, the rubber composition comprises at most 500% or 5 times (all by weight) more, or alternatively at most 40 phr more, of the polyisoprene than of the second polybutadiene.

In still another embodiment, the rubber composition comprises one or more of: from 10 to 20 phr of the second polybutadiene rubber, from 40 to 60 phr of the first polybutadiene rubber, from 30 to 50 phr said polyisoprene.

In still another embodiment, said polyisoprene is cis 1,4-polyisoprene, preferably synthetic cis 1,4-polyisoprene or natural rubber.

In another embodiment, the filler comprises predominantly silica.

In yet another embodiment, the rubber composition comprises 80 phr to 150 phr of silica, preferably from 80 phr to 140 phr silica, or even more preferably from 95 phr to 140 phr of silica or from 105 to 135 phr of silica.

In yet another embodiment, said silica has a BET surface area within a range of 90 $m^2/g$ to 140 $m^2/g$, preferably from 100 $m^2/g$ to 135 $m^2/g$.

In still another embodiment said plasticizer is a liquid plasticizer such as an oil or a liquid diene-based polymer. Liquid plasticizer means herein that the plasticizer is liquid at 23° C.

In still another embodiment, said plasticizers comprise at least one oil having a glass transition temperature below −35° C.

In still another embodiment, the rubber composition comprises 55 phr to 95 phr of at least one liquid plasticizer having a glass transition temperature within a range of −40° C. and −100° C. Preferably, said liquid plasticizer comprises or consists of one or more oils.

In yet another embodiment, a first oil has a glass transition temperature within a range of −40° C. and −85° C. and a second oil has a glass transition temperature within the range of −90° C. and −100° C. Preferably, the first oil is a mineral oil and/or the second oil is a triglyceride oil or vegetable oil.

In yet another embodiment, the rubber composition comprises from 8 phf (parts by hundred parts of filler, all by weight) to 15 phf of at least one silane.

In still another embodiment, the first polybutadiene rubber is functionalized for the coupling to silica.

In still another embodiment, said first polybutadiene rubber is functionalized with at least one of an amino group, a siloxy group, and a silane group. Preferably, the first polybutadiene rubber comprises at least one functional group selected from one or more of: an amino siloxy group, an amino siloxane group, and an amino silane group.

In still another embodiment said first polybutadiene rubber is end-chain functionalized with such groups.

In an embodiment, the rubber composition may include at least one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In another embodiment, an emulsion polymerization derived styrene/butadiene (ESBR) might be used having a styrene content of 20 to 28 percent bound styrene or, for some applications, an ESBR having a medium to relatively high bound styrene content, namely, a bound styrene content of 30 to 45 percent. In many cases the ESBR will have a bound styrene content which is within the range of 26 percent to 31 percent. By emulsion polymerization prepared ESBR, it may be meant that styrene and 1,3-butadiene are copolymerized as an aqueous emulsion. Such are well known to those skilled in such art. The bound styrene content can vary, for example, from 5 to 50 percent. In one aspect, the ESBR may also contain acrylonitrile to form a terpolymer rubber, as ESBAR, in amounts, for example, of 2 to 30 weight percent bound acrylonitrile in the terpolymer. Emulsion polymerization prepared styrene/butadiene/acrylonitrile copolymer rubbers containing 2 to 40 weight percent bound acrylonitrile in the copolymer may also be contemplated as diene-based rubbers.

In another embodiment, solution polymerization prepared SBR (SSBR) may be used. Such an SSBR may for instance have a bound styrene content in a range of 5 to 50 percent, preferably 9 to 36, percent, and most preferably 26 to 31 percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator. In still another embodiment, the solution styrene butadiene rubber is a tin-coupled polymer. In still another embodiment, the SSBR is functionalized for improved compatibility with silica. In addition, or alternatively the SSBR is thio-functionalized. This helps to improve stiffness of the compound and/or its hysteresis behavior. Thus, for instance, the SSBR may be a thio-functionalized, tin-coupled solution polymerized copolymer of butadiene and styrene.

However, preferably the rubber composition is free of any SBR, IBR and SIBR or comprises at least less than 5 phr of such rubbers.

In one embodiment, a synthetic or natural polyisoprene rubber (natural rubber) may be used. Synthetic cis-1,4 polyisoprene and natural rubber are as such well known to those having skill in the rubber art. In particular, the cis 1,4-microstructure content may be at least 90% and is typically at least 95% or even higher.

In one embodiment, cis-1,4 polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis-1,4-microstructure content ("high cis" content) and a glass transition temperature (Tg) in a range of from −95 to −110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference.

A glass transition temperature, or Tg, of an elastomer represents the glass transition temperature of the respective elastomer in its uncured state. A glass transition temperature of an elastomer composition represents the glass transition temperature of the elastomer composition in its cured state.

A Tg is determined as a peak midpoint by a differential scanning calorimeter (DSC) at a temperature rate of increase of 20° C. per minute, according to ASTM D3418 or equivalent.

The term “phr” as used herein, and according to conventional practice, refers to “parts by weight of a respective material per 100 parts by weight of rubber, or elastomer”. In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 to 5 phr, of one or more additional diene-based rubbers, such as SBR, SSBR, ESBR. In another example, the composition may include less than 5 phr, preferably less than 3, phr of an additional diene-based rubber or be also essentially free of such an additional diene-based rubber. The terms “compound” and “composition” and “formulation” may be used herein interchangeably, unless indicated otherwise. The terms “rubber” and “elastomer” may also be used herein interchangeably.

In another embodiment, the rubber composition includes from 1 phr to 80 phr, or from 5 phr to 80 phr, of a resin, preferably having a glass transition temperature Tg greater than 20° C. A Tg for resins is determined as a peak midpoint by a differential scanning calorimeter (DSC) at a temperature rate of increase of 10° C. per minute, according to ASTM D6604 or equivalent. Preferably, the resin has a softening point above 70° C. as determined by ASTM E28 which might sometimes be referred to as a ring and ball softening point. In one embodiment, the rubber composition includes from 10 phr to 60 phr or from 20 phr to 60 phr or from 30 phr to 60 phr of resin.

In another embodiment, the resin is selected from the group consisting of coumarone-indene resin, petroleum hydrocarbon resin, terpene polymers/resins, styrene/alphamethylstyrene resins, terpene phenol resin, rosin derived resins and copolymers and/or mixtures thereof.

A coumarone-indene resin preferably contains coumarone and indene as monomer components making up the resin skeleton (main chain). Monomer ingredients other than coumarone and indene which may be incorporated into the skeleton are, for example, methyl coumarone, styrene, alphamethylstyrene, methylindene, vinyltoluene, dicyclopentadiene, cyclopentadiene, and diolefins such as isoprene and piperlyene. Coumarone-indene resins have preferably melting points ranging from 10° C. to 160° C. (as measured by the ball-and-ring method). Even more preferably, the melting point ranges from 30 to 100° C.

Suitable petroleum resins include both aromatic and nonaromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include any C5 species (olefins and diolefines containing an average of five carbon atoms) such as cyclopentadiene, dicyclopentadiene, diolefins such as isoprene and piperylene, and any C9 species (olefins and diolefins containing an average of 9 carbon atoms) such as vinyltoluene, alphamethylstyrene and indene. Such resins are made by any mixture formed from C5 and C9 species mentioned above, and are known as C5/C9 copolymer resins. Petroleum resins are typically available with softening points ranging from 10° C. to 120° C. Preferably, the softening point ranges from 30 to 100° C.

In an embodiment, C5 resins are aliphatic resins made from one or more of the following monomers: 1,3-pentadiene (e.g., cis or trans), 2-methyl-2-butene, cyclopentene, cyclopentadiene, and dicyclopentadiene.

In another embodiment, a C9 resin is a resin made from one or more aromatic monomers, preferably chosen from the group of indene, methylindene, vinyl toluene, styrene and methylstyrene (such as alpha-methylstyrene).

In still another embodiment, a C9 modified resin is a resin (such as a C5 resin) which has been modified or functionalized with one or more aromatic monomers, preferably chosen from the group of indene, methylindene, vinyl toluene, styrene and methylstyrene (such as alpha methylstyrene).

Terpene resins are preferably comprised of polymers of at least one of limonene, alpha pinene, beta pinene and delta-3-carene. Such resins are available with melting points ranging from 10° C. to 135° C.

Terpene-phenol resins may be derived by copolymerization of phenolic monomers with terpenes such as limonenes, pinenes and delta-3-carene.

Representative for resins derived from rosins and derivatives thereof are, for example, gum rosin, wood rosin and tall oil rosin. Gum rosin, wood rosin and tall oil rosin have similar compositions, although the amount of components of the rosins may vary. Such resins may be dimerized, polymerized or disproportionated. Such resins may be in the form of esters of rosin acids and polyols such as pentaerythritol or glycol.

A styrene/alphamethylstyrene resin is considered herein to be a (preferably relatively short chain) copolymer of styrene and alphamethylstyrene with a styrene/alphamethylstyrene molar ratio in a range of about 0.05 to about 1.50. In one aspect, such a resin can be suitably prepared, for example, by cationic copolymerization of styrene and alphamethylstyrene in a hydrocarbon solvent. Thus, the contemplated styrene/alphamethylstyrene resin can be characterized, for example, by its chemical structure, namely, its styrene and alphamethylstyrene contents and by its glass transition temperature, molecular weight and molecular weight distribution.

In one embodiment, said resin may be partially or fully hydrogenated.

In a preferred embodiment, the rubber composition is resin free or comprises less than 5 phr of resin or less than 3 phr of resin, in particular hydrocarbon resin.

In embodiments, the rubber composition includes oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils.

A glass transition temperature Tg for liquid plasticizers, such as oil, is determined as a peak midpoint by a differential scanning calorimeter (DSC) at a temperature rate of increase of 10° C. per minute, according to ASTM E1356 or equivalent.

In an embodiment, the rubber composition includes silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g., sodium silicate. Silicas might be characterized, for example, by having a BET surface area, as measured using nitrogen gas. In one embodiment, the BET surface area may be in the range of 40 to 600 square meters per gram. In another embodiment, the BET surface area may be in a range of 50 to 300 square meters per gram. The BET surface area is determined according to ASTM D6556 or equivalent and is described in the Journal of the American Chemical Society, Volume 60, Page 304 (1930). The conventional silica may also be characterized by having a dibutylphthalate (DBP) absorption value in a range of 100 $cm^3$/100 g to 400 $cm^3$/100 g, alternatively 150 $cm^3$/100 g to 300 $cm^3$/100 g which is determined according to ASTM D 2414 or equivalent. A conventional silica might be expected to have an average ultimate particle size, for example, in the range of 0.01 to 0.05 micron as determined by the electron microscope, although the silica particles may be even smaller, or possibly larger, in size. Various commercially available silicas may be used, such as, only for example herein, and without limitation, silicas commercially available from PPG Industries under the Hi-Sil trademark with designations 210, 315G, EZ160G, etc.; silicas available from Solvay, with, for example, designations of Z1165MP and Premium200MP, etc. and silicas available from Evonik AG with, for example, designations VN2 and Ultrasil 6000GR, 9100GR, etc.

In still another embodiment, the rubber composition may comprise pre-silanized and/or precipitated silica.

In another embodiment, pre-silanized, or in other words pre-hydrophobated, precipitated silica utilized is hydrophobated prior to its addition to the rubber composition by treatment with at least one silane. Suitable silanes include but are not limited to alkylsilanes, alkoxysilanes, organoalkoxysilyl polysulfides and organomercaptoalkoxysilanes.

In an alternative embodiment, the pre-hydrophobated precipitated silica may be pre-treated with a silica coupling agent comprised of, for example, an alkoxyorganomercaptoalkoxysilane or combination of alkoxysilane and organomercaptoalkoxysilane prior to blending the pre-treated silica with the rubber instead of reacting the precipitated silica with the silica coupling agent in situ within the rubber. For example, see U.S. Pat. No. 7,214,731, the teachings of which are incorporated herein for the purpose of describing pre-hydrophobated precipitated silica and techniques for making such pre-hydrophobated precipitated silica.

In another embodiment, said pre-silanized precipitated silica is precipitated silica pre-reacted with a silica coupler comprised of bis(3-triethoxysilylpropyl)polysulfide containing an average of from 1 to 5 connecting sulfur atoms (preferably 2 to 4) in its polysulfidic bridge or an alkoxyorganomercaptosilane.

In an embodiment, the rubber composition includes carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 to 145 g/kg and a DBP number ranging from 34 to 150 $cm^3$/100 g. Iodine absorption values is determined according to ASTM D1510 or equivalent. Preferably, carbon black is used herein in amounts from 0.1 to 10 phr, ore 0.1 phr to 6 phr.

In one embodiment, the rubber composition may contain sulfur containing organosilicon compounds or silanes. Examples of suitable sulfur containing organosilicon compounds are of the formula:

$$Z—Alk—Sn—Alk—Z \qquad I$$

in which Z is selected from the group consisting of

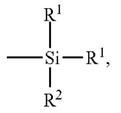
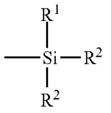
and
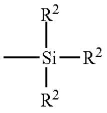

where R1 is an alkyl group of 1 to 4 carbon atoms, cyclohexyl or phenyl; R2 is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

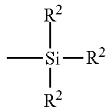

where R2 is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used. Generally speaking, the amount of the compound may range from 0.5 phr to 20 phr. Other preferred amounts are described herein above.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively within a range of 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire (or in other words tire components). For example, the rubber component may be a tread (including preferably a tread cap and/or a tread base), sidewall, apex, chafer, sidewall insert, wirecoat or innerliner.

Vulcanization of the pneumatic tire of the present invention may for instance be carried out at conventional temperatures ranging from 100° C. to 200° C. In one embodiment, the vulcanization is conducted at temperatures which are within a range of 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In a second aspect of the invention, the present invention is directed to a tire comprising the rubber composition according to the first aspect of the invention and optionally one or more of its embodiments.

The tire of the present invention may for example be a pneumatic tire or nonpneumatic tire, a race tire, a passenger tire, an aircraft tire, an agricultural tire, an earthmover tire, an off-the-road (OTR) tire, a truck tire, or a motorcycle tire. The tire may also be a radial or bias tire.

In one embodiment, said tire is a winter tire.

In another embodiment, said tire is a winter tire and/or a tire having on its sidewall the 3 peak mountain snowflake symbol (3PMSF symbol).

In still another embodiment, said the rubber composition is comprised in a tread of the tire.

In still another embodiment, the rubber composition is provided in a radially outermost layer of the tread (contacting the road when driving).

DETAILED DESCRIPTION OF THE INVENTION

Below Table 1 shows a non-limiting Inventive Example in accordance with an embodiment of the present invention and a Comparative Example which is not in accordance with the present invention.

TABLE 1

| | Amount in phr | |
|---|---|---|
| Ingredient | Comparative Example | Inventive Example |
| PBD 1[1] | 45 | 0 |
| PBD 2[2] | 0 | 45 |
| PBD 3[3] | 0 | 15 |
| NR[4] | 55 | 40 |
| Silica[5] | 100 | 115 |
| Carbon Black | 3 | 3 |
| Oil 1[6] | 25 | 35 |
| Oil 2[7] | 25 | 35 |
| Silane[8] | 6.2 | 11.5 |
| Stearic Acid | 3 | 2 |
| Waxes | 1.5 | 2.3 |
| Antidegradants[9] | 3.0 | 3.2 |
| Zinc Oxide | 2.5 | 2.5 |
| Sulfur | 1.6 | 1.6 |
| Accelerators[10] | 4.0 | 3.6 |

[1]Polybutadiene rubber having a Tg of −108° C. and a cis content of 96%, as Budene ™ 1223 by Goodyear
[2]Polybutadiene rubber functionalized for the coupling to silica and having a Tg of −90.5° C. and vinyl content of 14.5% and cis content of 34.5%, as KBR 820 from Kumho
[3]Polybutadiene rubber having a Tg of −28° C. and a vinyl content of 77%, as Europrene ™ BR HV80 from Versalis
[4]Natural rubber
[5]Low surface area silica having a BET surface area of 125 $m^2/g$
[6]Mineral oil having a Tg of −70° C.
[7]Sunflower oil having a Tg of −97° C.
[8]Bis-triethoxysilylpropyl disulfide, as SI266 ™ from Evonik
[9]Phenylenediamine types
[10]DPG and CBS types The compositions of Table 1 have been tested as tire tread compounds with the results shown below in Table 2.

TABLE 2

| | Amount in phr | |
|---|---|---|
| Property/ Performance | Comparative Example | Inventive Example |
| Ice [a] | 100 | 108 |
| Snow [b] | 100 | 100 |
| Dry Braking [c] | 100 | 99 |
| Rolling resistance [d] | 100 | 103 |
| Wet Braking [e] | 100 | 100 |

[a] Average acceleration, braking and handling on ice under same conditions, normalized to the comparative example (higher is better)
[b] Average acceleration, braking and handling on snow under same conditions, normalized to the comparative example (higher is better)
[c] Braking on dry road under same conditions, normalized to the comparative example (higher is better)
[d] Tire rolling resistance test under same conditions, normalized to the comparative example (higher is better)
[e] Braking on wet road under same conditions (below 10 ° C.), normalized to the comparative example (higher is better)

As shown in Table 2 above, the performance of the tire on ice has significantly improved (i.e. by 8 percent) when using the Inventive Example instead of the Comparative Example as tread rubber composition in the same passenger car winter tire.

The performance on snow and wet road has not changed and dry braking has only slightly been affected by the change to the rubber composition in accordance with the Inventive Example.

Rolling resistance has improved.

Thus, the rubber composition of the Inventive Example provides improved ice performance and rolling resistance at the same time. Snow performance, wet braking performance and/or dry breaking performance remain almost unchanged versus the Comparative Example. Thus, the respective winter tire is particularly suitable for the efficient use in regions facing frequently icy roads.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A rubber composition comprising:

35 phr to 60 phr of a first low cis polybutadiene rubber having a glass transition temperature within a range of −80° C. to −105° C., the first polybutadiene rubber being functionalized;

5 phr to 30 phr of a second high vinyl polybutadiene rubber having a glass transition temperature within a range of −20° C. to −40° C.;

10 to 60 phr of polyisoprene selected from one or more of synthetic polyisoprene and natural rubber;

30 phr to 200 phr of at least one filler; and 40 phr to 120 phr of at least one plasticizer having a glass transition temperature within a range of −40° C. to −110° C.

2. The rubber composition according to claim 1, wherein the first polybutadiene rubber has a vinyl content of less than 25%.

3. The rubber composition according to claim 1, wherein the second polybutadiene rubber has a vinyl content of at least 50%.

4. The rubber composition according to claim 1, wherein the rubber composition comprises more of the first polybutadiene rubber than of the polyisoprene, all by weight.

5. The rubber composition according to claim 1, wherein the rubber composition comprises one or more of:

from 40 to 60 phr of the first polybutadiene rubber, from 10 to 20 phr of the second polybutadiene rubber, and from 30 to 50 phr of the polyisoprene.

6. The rubber composition according to claim 1, wherein the filler comprises predominantly silica.

7. The rubber composition according to claim 1, wherein the rubber composition comprises 80 phr to 150 phr of silica.

8. The rubber composition according to claim 1, wherein the rubber composition comprises 105 phr to 140 phr of silica which has a BET surface area within a range of 90 $m^2/g$ to 140 $m^2/g$.

9. The rubber composition according to claim 1, wherein said plasticizer is a liquid plasticizer.

10. The rubber composition according to claim 1, wherein said plasticizer comprises at least one oil having a glass transition temperature below −40° C.

11. The rubber composition according to claim 1 comprising 55 phr to 95 phr of liquid plasticizer having a glass transition temperature within a range of −40° C. and −100° C.

12. The rubber composition according to claim 1, wherein said plasticizer comprises one or more of i) a first oil having a glass transition temperature within a range of −40° C. and −85° C., and ii) a second oil having a glass transition temperature within the range of −90° C. and −100° C.

13. The rubber composition according to claim 12, wherein the second oil is a triglyceride oil.

14. The rubber composition according to claim 12, wherein the first oil is a mineral oil.

15. The rubber composition according to claim 1, wherein the rubber composition comprises from 8 phf to 15 phf of at least one silane.

16. A tire comprising the rubber composition according to claim 1.

17. The tire according to claim 16, wherein the tire is a winter tire.

18. The tire according to claim 16, wherein the rubber composition is comprised in a tread of the tire.

19. The tire according to claim 18, wherein the rubber composition is comprised in a radially outermost layer of the tread.

* * * * *